(12) United States Patent
Lipton et al.

(10) Patent No.: US 6,388,797 B1
(45) Date of Patent: May 14, 2002

(54) ELECTROSTEREOSCOPIC EYEWEAR

(75) Inventors: Lenny Lipton, Greenbrae; Jeffrey James Halnon, Richmond; William McKee, Tiburon, all of CA (US)

(73) Assignee: StereoGraphics Corporation, San Rafael, CA (US)

( * ) Notice: Subject to any disclaimer, the term of this patent is extended or adjusted under 35 U.S.C. 154(b) by 0 days.

(21) Appl. No.: 09/403,469

(22) PCT Filed: May 29, 1998

(86) PCT No.: PCT/US98/10959

§ 371 Date: Oct. 22, 1999

§ 102(e) Date: Oct. 22, 1999

(87) PCT Pub. No.: WO98/54614

PCT Pub. Date: Dec. 3, 1998

(51) Int. Cl.[7] .......................... G02F 1/01; G02F 1/1335
(52) U.S. Cl. .......................................... 359/277; 349/13
(58) Field of Search .............................. 359/277, 630; 351/45, 158; 349/13, 58, 74, 83

(56) References Cited

U.S. PATENT DOCUMENTS

| | | | |
|---|---|---|---|
| 725,567 A | 4/1903 | Ives | 359/463 |
| 1,071,837 A | 9/1913 | Wayditch | 352/62 |
| 1,282,073 A | 10/1918 | Hahn | 352/65 |
| 1,307,074 A | 6/1919 | Baruch | 352/65 |
| 1,929,685 A | 10/1933 | Feil | 352/65 |
| 2,135,049 A | 11/1938 | Harvey | 352/65 |
| 2,146,135 A | 2/1939 | Adams et al. | 352/86 |
| 2,240,398 A | 4/1941 | Huitt | 352/60 |
| 2,268,712 A | 1/1942 | Luer et al. | 352/65 |
| 2,282,947 A | 5/1942 | Sherbinin | 352/60 |
| 2,301,254 A | 11/1942 | Carnahan | 348/57 |
| 2,303,742 A | 12/1942 | Howells | 352/65 |
| 2,313,561 A | 3/1943 | Mainardi et al. | 396/331 |
| 2,314,174 A | 3/1943 | Steinman | 396/331 |
| 2,317,875 A | 4/1943 | Athey et al. | 355/22 |
| 2,321,894 A | 6/1943 | Bischoff | 359/618 |
| 2,348,410 A | 5/1944 | Pastor | 352/62 |
| 2,362,790 A | 11/1944 | Austin | 359/462 |
| 2,403,733 A | 7/1946 | Mainardi et al. | 396/331 |
| 2,413,996 A | 1/1947 | Ramsdell | 396/331 |
| 2,495,288 A | 1/1950 | Richards | 396/331 |
| 2,568,327 A | 9/1951 | Dudley | 396/331 |
| 2,627,201 A | 2/1953 | Baker | 369/462 |
| 2,669,902 A | 2/1954 | Barnes | 359/407 |
| 2,693,128 A | 11/1954 | Dewhurst | 359/471 |
| 2,716,920 A | 9/1955 | Rosier | 359/462 |
| 2,724,311 A | 11/1955 | Albert | 396/323 |
| 2,736,250 A | 2/1956 | Papritz | 359/331 |
| 2,763,551 A | 9/1956 | Smith | 355/77 |
| 2,784,645 A | 3/1957 | Grey | 359/462 |
| 2,991,690 A | 7/1961 | Grey | 359/462 |
| 3,160,889 A | 12/1964 | Giacometti | 352/60 |
| 3,254,933 A | 6/1966 | Latulippe | 352/57 |
| 3,256,773 A | 6/1966 | Perdue | 353/10 |
| 3,551,036 A | 12/1970 | Bielusici | 352/60 |
| 3,674,339 A | 7/1972 | Sayanagi | 359/462 |
| 3,846,810 A | 11/1974 | Ihms | 396/331 |
| 3,891,313 A | 6/1975 | Murphy | 353/8 |
| 4,009,951 A | 3/1977 | Ihms | 353/7 |
| 5,463,428 A | * 10/1995 | Lipton et al. | 351/128 |
| 5,594,573 A | * 1/1997 | August | 349/13 |

* cited by examiner

Primary Examiner—Ricky Mack
(74) Attorney, Agent, or Firm—Degrosits & Noah LLP

(57) ABSTRACT

A pair of stereoscopic eyewear includes an element for integral assembly with the eyewear including a conductive circuit trace. The conductive pattern provides electrical contact between a contact area of the frame (which is hardwired to an electrical cable) and the contact pads of the liquid crystal shutter pair. Preferably, a conductive elastomer is used to facilitate the electrical contact to the shutters and the frame. Additionally, each wire of the cable is terminated with a fixed electrical contact adapted to securely mate with a slot in the frame that correspond to the contact area. A lens assembly attaches to the frame to rigidly hold the frame, the shutters and the conductive trace in intimate juxtapostion.

14 Claims, 4 Drawing Sheets

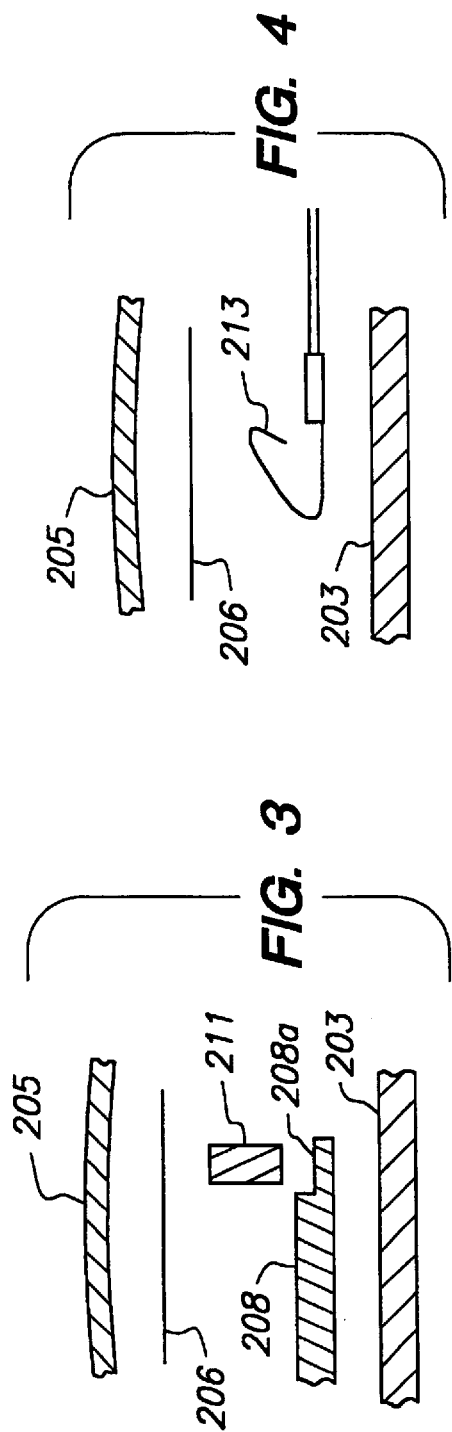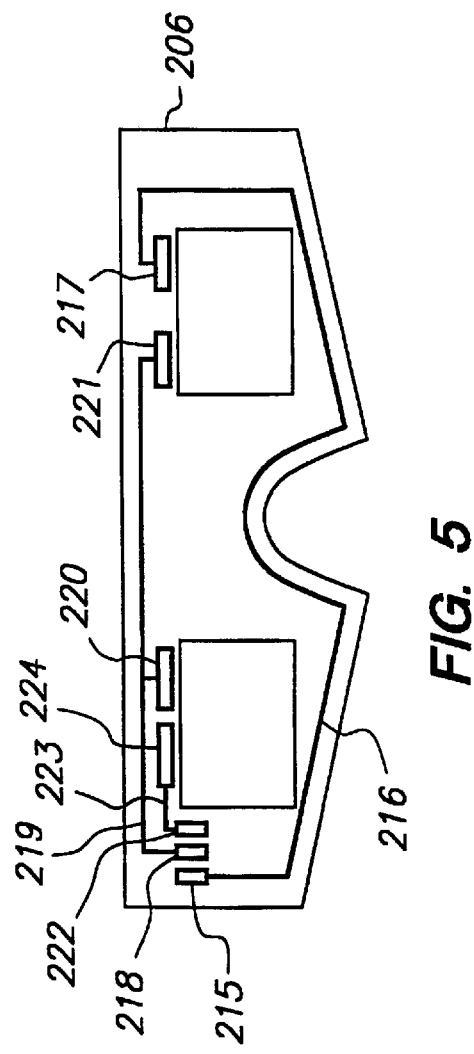

ELECTROSTEREOSCOPIC EYEWEAR

BACKGROUND OF THE INVENTION

The time-multiplexed technique for viewing electronic stereoscopic images is now a standard viewing modality for computer graphics and video. During the past decade, electro-stereoscopic displays have become a well-established means for viewing images on workstations in applications such as molecular modeling and various types of scientific visualiztion. In addition, video systems for various applications such as medical imaging have had some success in the marketplace. Lately, the application of time-multiplexed displays for the mass consumer personal computer market has been attempted with mixed success.

All of these systems use liquid crystal ("LC") shuttering eyewear for viewing stereoscopic images, such as Crystal-Eyes® eyewear or SimulEyes® eyewear, both manufactured by StereoGraphics Corporation of San Rafael, Calif. Various aspects of these products are described in the following patents: U.S. Pat. No. 4,884,876 entitled "Achromatic Liquid Crystal Shutter For Stereoscopic And Other Applications;" U.S. Pat. No. 4,967,268 entitled "Liquid Crystal Shutter System For Stereoscopic And Other Applications;" U.S. Pat. No. 5,117,302 entitled "High Dynamic Range Electro-Optical Shutter For Stereoscopic And Other Applications;" U.S. Pat. No. 5,181,133 entitled "Drive Method For Twisted Nematic Liquid Crystal Shutters For Stereoscopic And Other Applications; U.S. Pat. No. 5,463,428 entitled "Wireless Active Eyewear For Stereoscopic Applications;" and U.S. Pat. No. 5,572,250 entitled "Universal Electronic Stereoscopic Display."

LC shuttering eyewear for the mass consumer market must be manufactured at the lowest possible cost of goods in order to compete in what is essentially a commodity marketplace. Therefore, it is vitally important for the manufacturer of such eyewear to obtain every cost cutting competitive advantage in order to prevail in the marketplace. Such means are the subject of this disclosure.

SUMMARY OF THE INVENTION

The present invention is an apparatus and corresponding method for reducing the cost of manufacture of stereoscopic eyewear. The apparatus includes several features which lower the manufacturing cost by reducing the labor content and by providing an appropriate housing for the electronic components. One feature reduces assembly time by eliminating a complex wiring harness and the need to make individual connections. Another feature includes the driver electronics within the wired eyewear itself rather than within a cable or an adapter.

The apparatus includes a pair of liquid crystal shutters each having a contact pad for receiving electrical drive signals and a frame having a pair of eye openings therein suitable for receiving the shutters. An electrical cable is incorporated with the frame. The cable has a plurality of wires for providing drive signals to the shutters. Each wire has its end terminated with a fixed electrical contact. The frame includes an electrical contact area which includes a portion adapted to securely receive the electrical wire contacts. A conductive circuit trace is formed on an insulating material; which may be the frame or the lens assembly, or a separately added mask. The lens assembly attached to the frame to rigidly hold the frame, the shutters and the conductive trace in intimate juxtaposition.

In a preferred embodiment, conductive elastomers are used to provide electrical contact between portions of the conductive trace and the shutter contact pads and/or the electrical contact area of the frame.

In another embodiment, a printed circuit board is incorporated at the contact area of the frame. The printed circuit board is adapted to condition the drive signals to appropriately drive the liquid crystal shutters, thereby eliminating the need for a separate driver circuit external to the eyewear.

Many useful variations will be obvious to one with skill in this technology upon considering the following detailed description and drawings.

BRIEF DESCRIPTION OF THE DRAWINGS

FIG. 3 is a top plan view of a portion the eyewear of FIG. 2 taken across section 3—3.

FIG. 4 is a top plan view of a portion the eyewear of FIG. 2 taken across section 4—4.

FIG. 5 is a front plan view of the mask portion of FIG. 2 showing conductive traces.

DETAILED DESCRIPTION OF THE INVENTION

Figure 1:
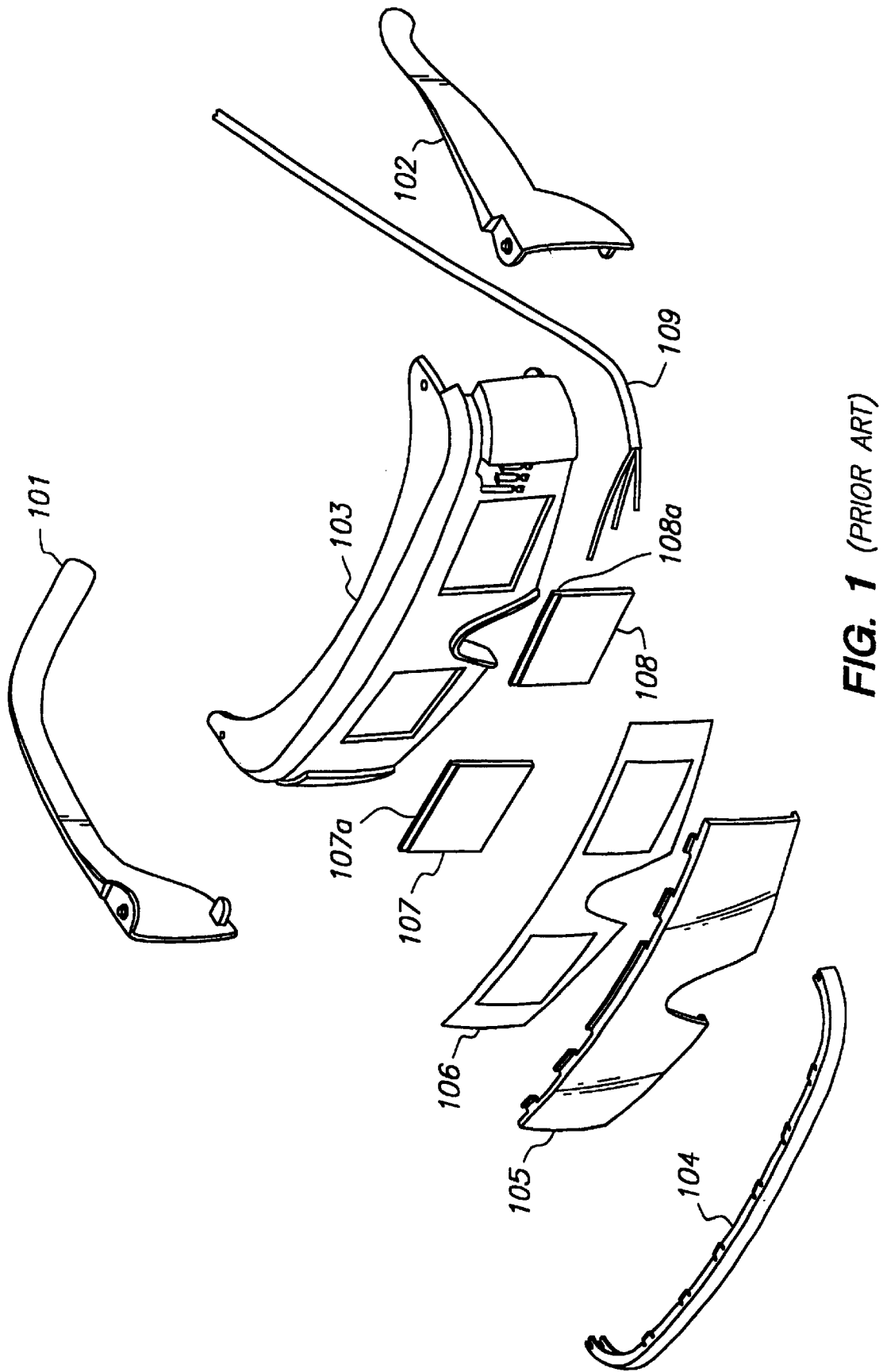
FIG. 1 is an exploded perspective view showing a conventional pair of shuttering eyewear.

FIG. 1 shows the construction of a conventional pair of stereoscopic eyewear. Hinged earpieces 101 and 102 and frame 103 are formed of molded plastic and snapped together in a well known manner. Cable 109 includes three conductors that are electrically attached to contact pads 107a and 100a on liquid crystal ("LC") shutters 107 and 108, respectively. A mask 106, preferably made of opaque paper or plastic material with cutouts for the shutters, is placed over the shutters 107 and 108 and frame 103 thereby effectively hiding from view the internal details of the assembly. The shutters 107 and 108 are held in place by a plastic lens 105, and the whole assembly is secured together by trim piece 104 with provision for integral snaps or the like.

The assembly of these eyewear is relatively simple, fast and economical, with the exception of the electrical connection between the cable 109 and the shutters 107 and 108. Thus, the real problem in producing the eyewear is the method of connecting the wires to the shutters.

A direct connection could be made by soldering the wires directly to the contact areas 107a and 108a. However, soldering must be done very carefllly to avoid damaging the shutter. Also, soldering takes too much time and the shutter remains quite hot afterwards. For these reasons, it is impractical to solder the wires onto the shutters as the eyewear final assembly is taking place.

Another method of attaching the wires is to use an electrically conductive adhesive to bond the wires to the contact pads. This is also not practical at final assembly as the adhesive takes a long time to cure. The soldering or gluing could be performed in a separate step prior to assembly, requiring only the placement of a combined cable/shutter assembly into the frame. However, this is impractical due to the delicate and time consuming handling required for the cable/shutter assembly.

Yet another method would be to include pins attached to the shutter contact pads and solder the wires to the pins. This is undesirable due to the additional space required. The eyewear would either have to be thicker or larger to make a space available for this soldered wire connection. One practical solution to this problem is to crimp a small metal clip onto the end of each conductor. This can be easily done in a preparatory step. Then, the clips simply slide onto the contact pad areas at final assembly.

What remains in this case and in all previously described methods is a wire management problem. The space around the shutters is limited. The wires need to be carefully controlled to pass them through the available channels and avenues between the frame and lens. The wires are wont to bend and move out of their assigned places as soon as they are released. It can be tedious and difficult to get everything aligned properly and the assembly completed. Such an assembly means does not lend itself to the requirements of mass production.

Figure 2:
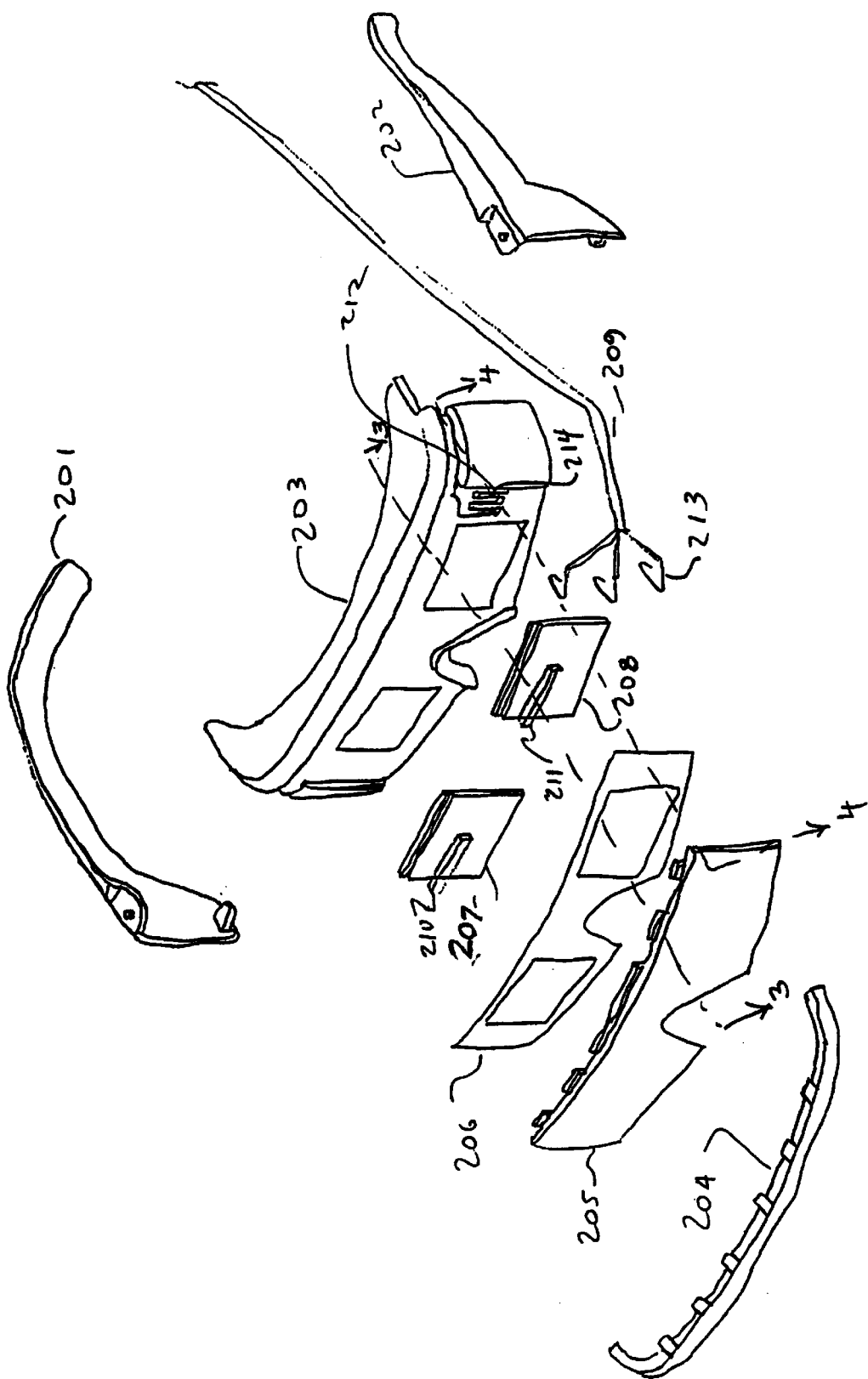
FIG. 2 is an exploded perspective view showing a pair of shuttering eyewear constructed in accord with the present invention.

An improvement over the prior art is shown in FIG. 2. In this case, the earpieces 201 and 202, frame 203, trim piece 204, lens 205, mask 206, and shutters 207 and 208 are like those in FIG. 1. Additional features of this embodiment are now shown and described, including the treatment of the ends of the wires in cable 209, the addition of conductive elastomers 210 and 211 to facilitate electrical contact with the LC shutters 207 and 208, respectively, and the inclusion of printed conductive traces on mask 206 (as shown in FIG.. 5).

As before, the mask 206 is an opaque material having two cutouts for the shutters. A primary purpose of mask 206 is to hide the wires and contact areas of the shutters. The mask fills the entire area of lens 205 for cosmetic purposes, creating a smooth and continuous surface visible through the lens.

As shown in FIG. 5, mask 206 includes a pattern of conductive circuit traces formed on a surface of mask 206. For example, a conventional spring contact pad 215 is connected by conductive trace 216 to elastomer contact pad 217, which is simply a flat, rectangular printed contact area A second spring contact pad 218 is connected by conductive trace 219 to elastomer contact pads 220 and 221 (common line to both shutters). A third spring contact pad 222 is connected by conductive trace 223 to elastomer contact pad 224. These conductive traces are easily and inexpensively printed onto a plastic mask by conventional methods using conductive inks.

The mask and shutter are thus arranged so that conductive elastomer 210 makes electrical contact with the shutter contact pad 207a and the elastomer contact pattern areas 217 and 221, while conductive elastomer 211 makes electrical contact with the shutter contact pad 208a and the elastomer contact pattern areas 220 and 224.

Advantageously, the conductive traces are routed to one side of the mask 206 where they terminate at spring contact pads 215, 218 and 222. These spring contact pads 215, 218 and 222 contact respective spring pins 213 that have been crimped onto the wires.

It should be obvious to one skilled in this technology that many different routes or constructions of conductive patterns could be implemented to provide a suitable electrical interconnection with the LC shutters. In addition, the conductive patterns could conceivably be incorporated on other portions of the assembly, for example, on the frame.

FIG. 3 is a more detailed illustration of the area where the shutters are located. In this Figure, only the left eye assembly (as viewed by the user) is shown, but it is recognized that the right shutter area will have the same construction. In assembly, the lens 205 presses the mask 206 onto elastomer 211, which is located over the contact pad area 208a of shutter 208, thereby making electrical contact between the conductive patterns printed on the mask and the LC shutter. The lens 205 is seated in a pocket (not shown) in frame 203.

The elastomer 211 is a "zebra" type elastomer made from alternating layers of conducting and insulating materials in a well known manner. This type of elastomer is common for use with liquid crystal displays ("LCD's"), allowing one elastomer to bridge contact with several circuits.

FIG. 4 shows additional detail of the area where the wires are terminated. Here the lens 205 presses the mask 206 into spring clip 213, such as Molex part number 08-50-0114, which has been crimped onto the end of each wire in cable 209. This Molex clip is simple, reliable, inexpensive, and easily attached to the wire prior to final assembly. The clip is inserted into a retaining slot 214 in frame 203 (see FIG. 2) where it is held up against the mask 206 and lens 205.

Figure 6A:
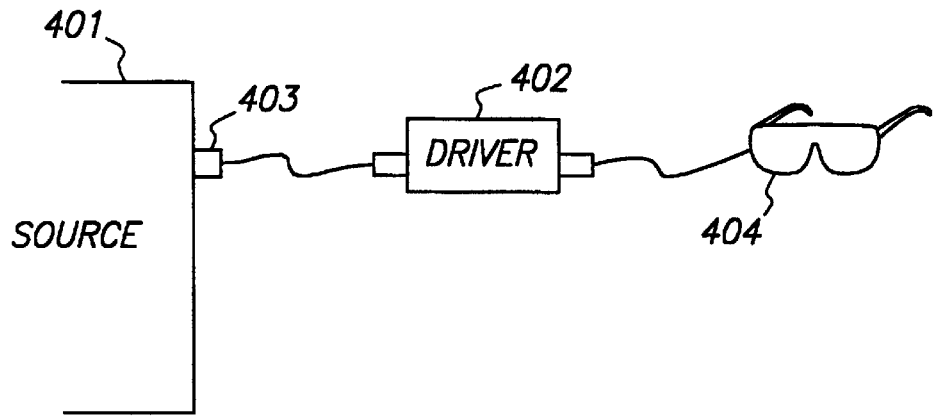
FIGS. 6a and 6b are block diagrams showing typical applications with shuttering eyewear.

FIG. 6a shows a typical application of the eyewear described in this disclosure. Source 401 is usually a computer but may be any source of time-multiplexed stereoscopic images. Driver electronics 402 are connected to the source 401 at connector 403, which contains a synchronizing signal and power for the driver circuitry. There are several connectors currently in use. The preferred connector is a 3 pin mini-DIN circular receptacle. Other suitable connectors include the 3.5 mm stereo phone jack and the 9 pin sub-miniature "D" socket. Eyewear 404 is connected to driver electronics 402, which is a separate electronics package in a separate housing. The driver electronics 402 converts the supplied power and synchronizing signals into the shutter drive voltages required by the eyewear.

Figure 6B:
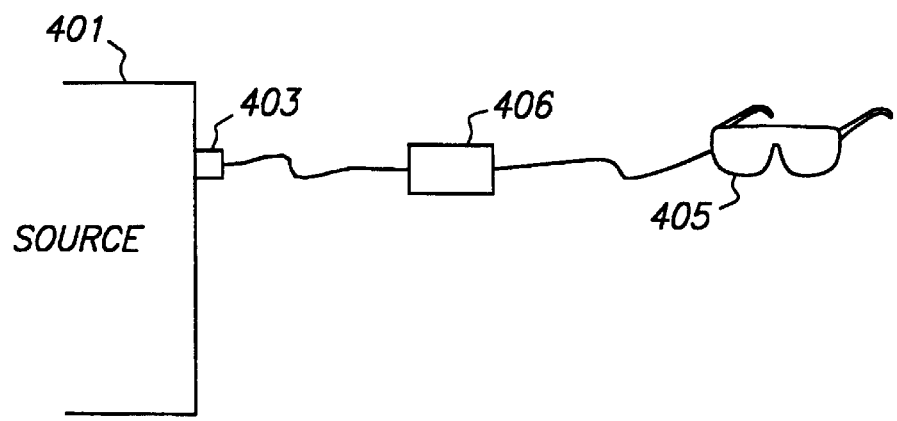

FIG. 6b shows an alternate approach. Eyewear 404 connect directly to the source 401 at connector 403 and do not require a separate driver electronics unit. Instead, the functional part of the driver electronics are constructed in as small a volume as possible and are included in an overmolded circuit board 406 inserted at a point along the cable, typically at the source connector end. Thus, the electronics become part of the cable. The other end of the cable attaches to the shutters within eyewear 404 using the methods as shown in FIG. 2, for example.

Figure 7:
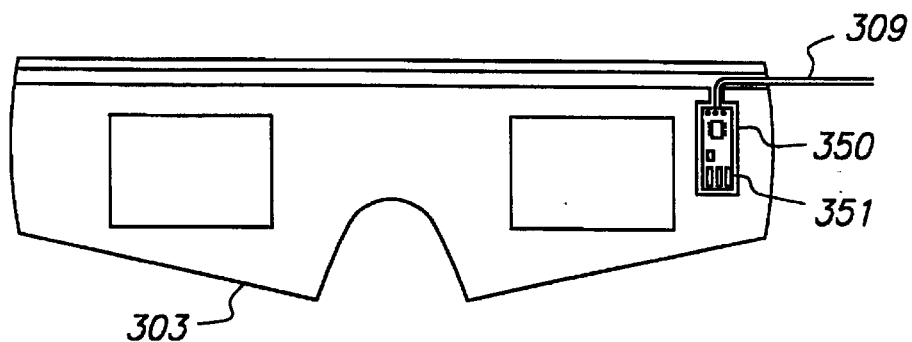
FIG. 7 is a front plan view of an alternative embodiment of the frame portion of FIG. 2.

An improvement to the circuit arrangement of FIG. 6b is shown in FIG. 7. Frame 303 includes an area to accept circuit board 350. Circuit board 350 is electrically connected to the wires of cable 309. The circuit board 350 converts the supplied power and synchronizing signals into the required shutter drive voltages. Contact pad area 351 is typical of the three contact pad areas that make contact with an elastomer and an appropriate mask, as previously described, to route the signals to the shutters. The circuit board 350 with cable 309 attached can be assembled and tested as a separate unit and installed quickly and easily at final assembly. Thus, a subassembly known to be operational is installed thereby reducing the probability of failure of a completed unit. Cost reduction is possible with this method compared with the prior art because there is no need to build a separate housing with electronics. Cost is saved by placing the LC drive electronics within the eyewear itself.

An alternative embodiment uses the same construction technique shown in FIG. 7, wherein the cable is soldered to a circuit board mounted in a convenient region of the frame 203, and the circuit board connects via one or more elastomers using techniques described earlier to the mask 206, thereby creating eyewear compatible with that shown in FIG. 1 and FIG. 2.

We claim:

1. Stereoscopic eyewear, comprising:
   a pair of liquid crystal shutters each having a contact pad for receiving electrical drive signals;
   a frame having a pair of eye openings therein suitable for receiving the shutters;
   an electrical cable incorporated with the frame and having a plurality of wires for providing drive signals, each wire having an end which is terminated with an electrical contact;
   an electrical contact area incorporated with the frame and adapted to securely receive said electrical contacts;
   an electrical coupling between the electrical contact area of the frame and respective contact pads of the shutters, said coupling including a conductive circuit trace formed on an insulating material; and
   a lens assembly coupled to the frame and rigidly holding the frame, the shutters and the electrical coupling in intimate juxtaposition.

2. Stereoscopic eyewear as in claim 1, wherein the conductive trace is formed on a portion of the lens assembly.

3. Stereoscopic eyewear as in claim 1, wherein the conductive trace is formed on a portion of the frame.

4. Stereoscopic eyewear as in claim 1, further comprising a mask held between the lens assembly and the frame, wherein the conductive trace is formed on a portion of the mask.

5. Stereoscopic eyewear as in claim 1, wherein a conductive elastomer is positioned between each contact pad of the shutters and the electrical coupling.

6. Stereoscopic eyewear as in claim 1, wherein a conductive elastomer is positioned between the contact area of the frame and the electrical coupling.

7. Stereoscopic eyewear as in claim 1, wherein each wire is terminated with a spring pin, and wherein the contact area of the frame includes corresponding retaining slots adapted to receive each spring pin.

8. Stereoscopic eyewear as in claim 1, wherein the electrical contact area includes a printed circuit board adapted to condition the drive signals to appropriately drive the liquid crystal shutters.

9. A method for making a pair of stereoscopic eyewear, comprising the steps of:
   providing a pair of liquid crystal shutters each having a contact pad for receiving a drive signal;
   providing a frame having a pair of eye openings suitable for receiving the liquid crystal shutter;
   incorporating with the frame an electrical cable having a plurality of wires for providing the drive signals;
   incorporating with the frame an electrical contact area including a plurality of retaining slots;
   terminating the end of each wire with a spring clip adapted to mate with the retaining slot;
   inserting each spring clip into a respective retaining slot;
   providing a conductive pattern on a insulating material suitable for providing electrical contact between the contact pads of the shutters and the contact area of the frame; and
   providing a lens assembly for holding the frame, shutters and conductive pattern in intimate juxtaposition.

10. The method of claim 9, wherein the conductive pattern is provided on the frame.

11. The method of claim 9, wherein the conductive pattern is provided on the lens assembly.

12. The method of claim 9, wherein the conductive pattern is provided on a mask which is held in intimate juxtaposition with the frame and the shutters by the lens assembly.

13. In stereoscopic eyewear wherein a pair of liquid crystal shutters are mounted in corresponding openings in a frame and each shutter has a contact pad adapted for receiving electrical drive signals to the shutter, wherein the improvement comprises the frame having a conductive circuit trace formed on an insulating material and held in contact with the contact pads.

14. Stereoscopic eyewear as in claim 13, wherein the conductive circuit trace is formed on a mask held in intimate juxtaposition with the frame.

* * * * *